US012775279B2

United States Patent
(12) United States Patent
Lunscher et al.

(10) Patent No.: US 12,775,279 B2
(45) Date of Patent: Oct. 27, 2026

(54) SYSTEMS AND METHODS FOR OPERATING A MOBILE ROBOT WITH STEREO IMAGING DEVICES MOUNTED THEREON

(71) Applicant: Clearpath Robotics Inc., Kitchener (CA)

(72) Inventors: Nolan Lunscher, Kitchener (CA); Jake McLaughlin, Burlington (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 165 days.

(21) Appl. No.: 18/799,658

(22) Filed: Aug. 9, 2024

(65) Prior Publication Data

US 2026/0044148 A1 Feb. 12, 2026

(51) Int. Cl.
*G05D 1/243* (2024.01)
*G05D 1/648* (2024.01)

(52) U.S. Cl.
CPC ........... *G05D 1/2435* (2024.01); *G05D 1/648* (2024.01)

(58) Field of Classification Search
None
See application file for complete search history.

(56) References Cited

U.S. PATENT DOCUMENTS

| | | | | |
|---|---|---|---|---|
| 7,957,562 | B2 * | 6/2011 | Chang | G06V 20/58 382/113 |
| 10,692,234 | B2 * | 6/2020 | Cole | G06T 7/557 |
| 11,361,469 | B2 * | 6/2022 | Raag | G06T 7/85 |

(Continued)

FOREIGN PATENT DOCUMENTS

| | | | | |
|---|---|---|---|---|
| CN | 116051916 A | * 5/2023 | | G06T 7/593 |
| CN | 118154698 A | * 6/2024 | | G06T 7/85 |
| JP | 2019164136 A | * 9/2019 | | G01C 7/04 |
| KR | 20160130239 A | * 11/2016 | | G09G 3/3426 |

(Continued)

OTHER PUBLICATIONS

M. Faisal, H. Mathkour and M. Alsulaiman, "I3MS: Intelligent Multi-Sensor Multi-Baseline Mapping System," in IEEE Access, vol. 6, pp. 4243-4254, 2018, doi: 10.1109/ACCESS.2017.2788422. (Year: 2018).*

(Continued)

*Primary Examiner* — Mahmoud S Ismail
*Assistant Examiner* — Jacob Daniel Underbakke

(57) ABSTRACT

Systems and methods for operating a mobile robot is disclosed. The system can include a pair of stereo imaging devices mounted on the mobile robot, a memory storing a current baseline, and a processor. The pair of stereo imaging devices include a first and a second imaging device. The current baseline is representative of a distance between the first and the second imaging devices. The processor is operable to: autonomously navigate the mobile robot to a visual target; while the visual target is within viewing range, capture an image of the visual target; generate a plurality of depth measurements from the image; compare the plurality of depth measurements with corresponding depth estimates; and update the current baseline based on the comparisons. The mobile robot is operable to autonomously execute a mission within an environment; and while executing the mission, use the current baseline for sensing the environment.

20 Claims, 10 Drawing Sheets

(56) References Cited

U.S. PATENT DOCUMENTS

| | | | | |
|---|---|---|---|---|
| 2006/0210117 | A1* | 9/2006 | Chang | G06V 20/00 382/113 |
| 2014/0111623 | A1* | 4/2014 | Zhao | H04N 13/128 348/47 |
| 2017/0251193 | A1* | 8/2017 | Zhou | H04N 13/239 |
| 2018/0194007 | A1* | 7/2018 | Namiki | B25J 19/04 |
| 2019/0058870 | A1* | 2/2019 | Rowell | H04N 13/189 |
| 2020/0051282 | A1* | 2/2020 | Watanabe | G06T 7/593 |
| 2021/0233277 | A1* | 7/2021 | Raag | G06T 7/85 |
| 2021/0327092 | A1* | 10/2021 | Jiang | B60W 40/02 |
| 2022/0046218 | A1* | 2/2022 | Fan | G06T 7/11 |
| 2022/0118994 | A1* | 4/2022 | Lu | G06T 7/85 |
| 2023/0281862 | A1* | 9/2023 | Urfalioglu | G06T 7/70 382/106 |
| 2024/0022830 | A1* | 1/2024 | Beziaeva | G06T 7/73 |
| 2024/0024028 | A1* | 1/2024 | Barazani | A61B 34/10 |

OTHER PUBLICATIONS

Z. Kowalczuk and T. Merta, "Three-dimensional mapping for data collected using variable stereo baseline," 2016 21st International Conference on Methods and Models in Automation and Robotics (MMAR), Miedzyzdroje, Poland, 2016, pp. 1082-1087, doi: 10.1109/MMAR.2016.7575288. (Year: 2016).*

Sumetheeprasit B, Rosales Martinez R, Paul H, Ladig R, Shimonomura K. Variable Baseline and Flexible Configuration Stereo Vision Using Two Aerial Robots. Sensors (Basel). Jan. 18, 2023;23(3):1134. doi: 10.3390/s23031134. PMID: 36772173; PMCID: PMC9921183. (Year: 2023).*

L. Lonini, Y. Zhao, p. Chandrashekhariah, B. E. Shi and J. Triesch, "Autonomous learning of active multi-scale binocular vision," 2013 IEEE Third Joint International Conference on Development and Learning and Epigenetic Robotics (ICDL), Osaka, Japan, 2013, pp. 1-6, doi: 10.1109/DevLrn.2013.6652541. (Year: 2013).*

Intel, "Intel RealSense Product Family D400 Series Calibration Tools", Jul. 2020, retrieved on May 10, 2024 from <https://www.intel.com/content/dam/support/us/en/documents/emerging-technologies/intel-realsense-technology/RealSense_D400_Dyn_Calib_User_Guide.pdf>.

Tangram Vision, "Metrical Multimodal Sensor Calibration Tool" retrieved on May 10, 2024 from <https://www.tangramvision.com/products/calibration/metrical>.

Grunnet-Jepsen et al., "Intel RealSense Self-Calibration for D400 Series Depth Cameras" retrieved on Oct. 21, 2024 from <https://dev.intelrealsense.com/docs/self-calibration-for-depth-cameras>.

* cited by examiner

SYSTEMS AND METHODS FOR OPERATING A MOBILE ROBOT WITH STEREO IMAGING DEVICES MOUNTED THEREON

FIELD

The described embodiments relate generally to systems and methods of operating a mobile robot involving calibrating stereo imaging devices mounted thereon the mobile robot.

BACKGROUND

Mobile robots, also referred to as self-driving vehicles, are increasingly employed in various different settings, including industrial settings such as warehouse facilities. In many cases, mobile robots navigate within their environment to perform tasks, including stopping to drop off or pick up items. In the course of navigating within their environment, the mobile robots need to operate in a safe manner, such as operating to avoid collisions (e.g., with objects or pedestrians).

Many mobile robots rely on a sensing system to detect objects within their environment for navigation and collision avoidance. The results of the sensing system depends on the calibration of the sensing system. Poor calibration of the sensing system can result in an inaccurate perception of the environment and poor navigation and collision avoidance decisions based on the inaccurate perception of the environment.

SUMMARY

The various embodiments described herein generally relate to methods (and associated systems configured to implement the methods) for operating one or more mobile robots. The mobile robot includes at least one processor, at least one pair of stereo imaging devices mounted thereon, and a memory storing a current baseline for each pair of stereo imaging devices. Each pair of stereo imaging devices can include a first imaging device and a second imaging device. The current baseline for each pair of stereo imaging devices is representative of a distance between the first imaging device and the second imaging device of that pair of stereo imaging devices. The method includes operating a mobile robot to autonomously navigate to a visual target; while the visual target is within a viewing range of a first pair of stereo imaging devices of the at least one pair of stereo imaging devices, operating the first pair of stereo imaging devices to capture an image of the visual target. The image includes a plurality of sample points generated based on the visual target. The method includes operating the at least one processor to: generate a plurality of depth measurements for the plurality of sample points of the image; compare the plurality of depth measurements with corresponding depth estimates for the plurality of sample points; and update the current baseline of the first pair of stereo imaging devices based on the comparisons of the plurality of depth measurements with the corresponding depth estimates. The depth measurements are based on the current baseline of the first pair of stereo imaging devices. The method further includes operating the mobile robot to autonomously execute a mission within an environment; and while executing the mission, operating the at least one processor to use the current baseline for sensing the environment.

In some embodiments, the method can involve operating the at least one processor to: estimate a pose of the visual target shown in the image based on the known dimensions of the visual target; and generate the plurality of depth estimates for the plurality of sample points based on the estimated pose of the visual target shown in the image.

In some embodiments, the method can involve operating the at least one processor to, for each sample point of the plurality of sample points, determine a point difference between the depth measurement for that sample point and the depth estimate for that sample point.

In some embodiments, the method can involve operating the at least one processor to, compare the plurality of point differences between the depth measurements and the depth estimates for the plurality of sample points with a Gaussian distribution; and in response to determining that the plurality of point differences is similar to a Gaussian distribution, update the current baseline to a value that minimizes an average of the point differences.

In some embodiments, the average of the point differences can include a mean of the point differences.

In some embodiments, the method can involve operating the at least one processor to update the current baseline of the first pair of stereo imaging devices based on a first imaging device of the first pair of stereo imaging devices having a same pose before and after the update.

In some embodiments, the method can involve operating the first pair of stereo imaging devices to capture the image of the visual target while a longitudinal axis defined by the first pair of stereo imaging devices is non-parallel to a plane defined by the visual target.

In some embodiments, the first pair of stereo imaging devices mounted thereon the mobile robot can have a lower height than the visual target.

In some embodiments, the method can involve operating the mobile robot to remain stationary while the first pair of stereo imaging devices capture the image of the visual target.

In some embodiments, the method can involve operating the mobile robot to autonomously navigate to a pre-determined proximity of less than 4.5 meters from the visual target.

In accordance with another aspect, there is generally disclosed herein systems for operating a mobile robot. The system includes at least one pair of stereo imaging devices mounted on the mobile robot, a memory storing a current baseline for each pair of stereo imaging devices, and at least one processor. Each pair of stereo imaging devices includes a first imaging device and a second imaging device. The current baseline for each pair of stereo imaging devices is representative of a distance between the first imaging device and the second imaging device of that pair of stereo imaging devices. The processor is operable to: autonomously navigate the mobile robot to a visual target; while the visual target is within viewing range of a first pair of stereo imaging devices of the at least one pair of stereo imaging devices, operating the first pair of stereo imaging devices to capture an image of the visual target. The image includes a plurality of sample points generated based on the visual target. The at least one processor is operable to generate a plurality of depth measurements for the plurality of sample points of the image; compare the plurality of depth measurements with corresponding depth estimates for the plurality of sample points, the depth measurements being based on the current baseline of the first pair of stereo imaging devices; and update the current baseline of the first pair of stereo imaging devices based on the comparisons of the plurality of depth measurements with the corresponding depth estimates. The mobile robot is operable to autonomously execute a mission within an environment; and while executing the mission, use the current baseline for sensing the environment.

In some embodiments, the at least one processor can be operable to: estimate a pose of the visual target shown in the image based on the known dimensions of the visual target; and generate the plurality of depth estimates for the plurality of sample points based on the estimated pose of the visual target shown in the image.

In some embodiments, the at least one processor can be operable to, for each sample point of the plurality of sample points, determine a point difference between the depth measurement for that sample point and the depth estimate for that sample point.

In some embodiments, the at least one processor can be operable to: compare the plurality of point differences between the depth measurements and the depth estimates for the plurality of sample points with a Gaussian distribution; and in response to determining that the plurality of point differences is similar to a Gaussian distribution, update the current baseline to a value that minimizes an average of the point differences.

In some embodiments, the average of the point differences can include a mean of the point differences.

In some embodiments, the at least one processor can be operable to update the current baseline of the first pair of stereo imaging devices based on a first imaging device of the first pair of stereo imaging devices having a same pose before and after the update.

In some embodiments, the pair of stereo imaging devices can be operable to capture the image of the visual target while a longitudinal axis defined by the first pair of stereo imaging devices is non-parallel to a plane defined by the visual target.

In some embodiments, the first pair of stereo imaging devices mounted thereon the mobile robot can have a lower height than the visual target.

In some embodiments, the at least one processor can be operable to maintain the mobile robot in a stationary position while the first pair of stereo imaging devices capture the image of the visual target.

In some embodiments, the at least one processor can be operable to autonomously navigate the mobile robot to a pre-determined proximity of less than 4.5 meters from the visual target.

BRIEF DESCRIPTION OF THE DRAWINGS

Several embodiments will now be described in detail with reference to the drawings, in which.

Figure 1:
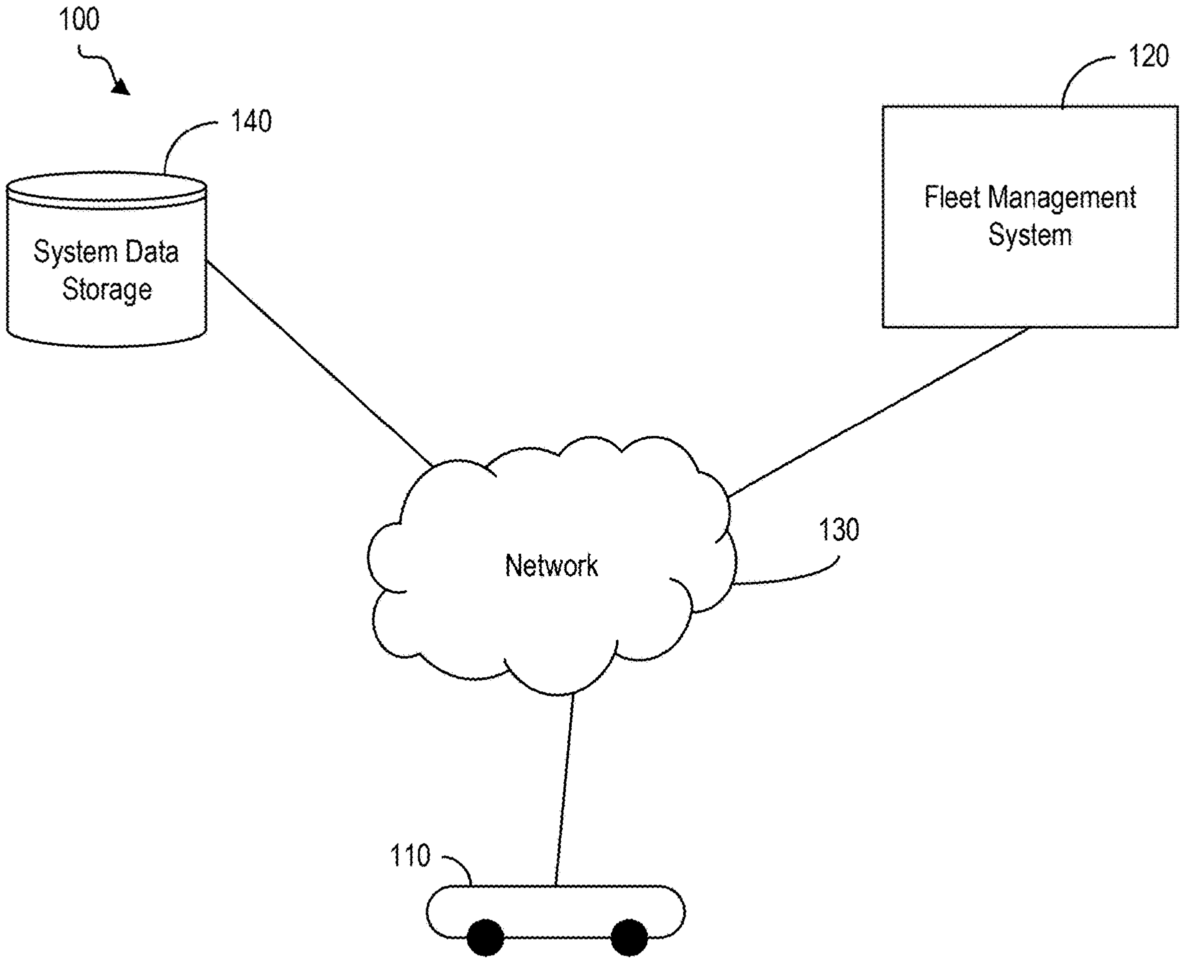
FIG. 1 is a block diagram illustrating an example mobile robot in communication with example components, according to an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Mobile robots may navigate within their environment to execute missions. In the course of navigating, the mobile robot can sense objects within their environment to perform various tasks or obstacles to avoid collisions. The detection of objects within the environment can rely on a sensing system, including imaging devices or cameras. The accuracy of the results obtained from imaging devices or cameras is dependent on their calibration.

Existing methods for calibrating stereo imaging devices usually require multiple images of a calibration target. However, it can be time-intensive and cumbersome to collect multiple images. Such processes can also require manual intervention to capture the requisite image of the calibration target. However, manual processes can also be error prone. Further, manual intervention is not desirable for autonomous vehicle applications.

Existing methods for calibrating stereo imaging devices without a calibration target usually rely on simultaneous localization and mapping (SLAM) or structure from motion (SFM) algorithms. However, such targetless calibration methods can be limited by the environments in which they can operate well in. In addition, targetless calibration methods are heavily reliant on the method that gathers the trajectory. If the method of gathering the trajectory is error prone, the resulting calibration can also be error prone.

Existing methods for calibrating a baseline distance between stereo imaging devices using a single measurement can require the stereo imaging devices being parallel to a plane of the calibration target. This requirement for the imaging devices to be parallel with the calibration target does not account for measurement errors. For example, there can be errors in the alignment of the stereo imaging devices relative to the calibration target. Further, this requirement poses a challenge for mobile robots that operate on the ground. Mobile robots operating on the ground typically have stereo imaging cameras angled upwards. That is, stereo imaging cameras mounted on mobile robots can have an upward tilt.

Disclosed herein are systems and methods for operating the mobile robot to calibrate stereo imaging devices autonomously, that is, without a human in the loop. The systems and methods disclosed herein can involve capturing only one image of a visual target, and therefore be faster and simpler. Automating the calibration of stereo imaging devices can decrease downtime of the mobile robot, which reduces costs and increases performance. Automating the calibration of stereo imaging devices can reduce the amount of time that the autonomous vehicle systems operate with incorrect data, and increase the amount of time that autonomous vehicle system can operate at greater efficiency.

Referring now to FIG. 1, shown therein a block diagram 100 illustrating an example mobile robot 110 in communication with example components. As shown in FIG. 1, the mobile robot 110 can be in communication with a fleet management system 120 and a system data storage 140 via a network 130.

A mobile robot 110 in FIG. 1 is shown for illustrative purposes. More mobile robots 110 can be included. In some example cases, the mobile robot 110 can operate to pick up, transport, and/or drop off materials at various locations.

The network 130 may be any network capable of carrying data, including the Internet, Ethernet, old telephone service (POTS) line, public switch telephone network (PSTN), integrated services digital network (ISDN), digital subscriber line (DSL), coaxial cable, fiber optics, satellite, mobile, wireless (e.g. Wi-Fi™, WiMAX®), Signaling System 7 (SS7) network, fixed line, local area network (LAN), wide area network (WAN), and others, including any combination of these, capable of interfacing with, and enabling communication between the mobile robots 110, the fleet management system 120 and/or the system data storage 140. In some embodiments, the mobile robot 110 can communicate with other robots via the network 130. In some embodiments, the mobile robot 110 can communicate with other robots directly via onboard communication components.

The system data storage 140 can store data related to the mobile robots 110 and/or the fleet management system 120. The system data storage 140 can include RAM, ROM, one or more hard drives, one or more flash drives or some other suitable data storage elements such as disk drives, etc.

The system data storage 140 can also store electronic maps related to the operating environment of the mobile robot 110. The electronic maps located on system data storage 140 can be accessible for download, via the network 130, by the fleet management system 120 and the mobile robot 110. In some embodiments, the electronic map can be generated and updated by the fleet management system 120 based on information received from the mobile robot 110. In some embodiments, the system data storage 140 can be located at the fleet management system 120.

The illustrated FIG. 1 includes the fleet management system 120. The fleet management system 120 can operate to direct and/or monitor the operation of the mobile robot 110. In some embodiments, the mobile robot 110 can operate within a decentralized network—without, or at least with minimal, involvement of the fleet management system 120.

The fleet management system 120 can include a processor, a data storage, and a communication component (not shown). For example, the fleet management system 120 can be any computing device, such as, but not limited to, an electronic tablet device, a personal computer, workstation, server, portable computer, mobile device, personal digital assistant, laptop, smart phone, WAP phone, an interactive television, video display terminals, gaming consoles, and portable electronic devices or any combination of these. The components of the fleet management system 120 can be provided over a wide geographic area and connected via the network 130.

The processor of the fleet management system 120 can include any suitable processors, controllers or digital signal processors that can provide sufficient processing power depending on the configuration, purposes and requirements of the fleet management system 120. In some embodiments, the processor can include more than one processor with each processor being configured to perform different dedicated tasks.

The data storage of the fleet management system 120 can include random access memory (RAM), a read-only memory (ROM), an erasable programmable read-only memory (EPROM, EEPROM, or Flash memory), one or more hard drives, one or more flash drives or some other suitable data storage elements such as disk drives, etc. The communication component of the fleet management system 120 can include any interface that enables the fleet management system 120 to communicate with other devices and systems. In some embodiments, the communication component can include at least one of a serial port, a parallel port or a USB port. The communication component may also include at least one of an Internet, Local Area Network (LAN), Ethernet, Firewire, modem or digital subscriber line connection. Various combinations of these elements may be incorporated within the communication component. For example, the communication component may receive input from various input devices, such as a mouse, a keyboard, a touch screen, a thumbwheel, a track-pad, a track-ball, a card-reader, voice recognition software and the like depending on the requirements and implementation of the fleet management system 120.

In some embodiments, the fleet management system 120 can generate commands or missions for the mobile robots 110. For example, the fleet management system 120 can generate and transmit navigational commands to the mobile robot 110. The navigational commands can direct the mobile robot 110 to navigate to one or more waypoints or destination locations located within the operating environment of the mobile robot 110. For example, the destination locations can correspond to locations where the mobile robot 110 is required to pick up or drop off loads.

In some embodiments, the fleet management system 120 can transmit the destination locations to the mobile robot 110 and the mobile robot 110 can then navigate itself to the waypoints or destination locations. The fleet management system 120 can transmit the destination locations in various formats, such as, but not limited to, a set of Global Positioning System (GPS) coordinates, or coordinates defined relative to an electronic map accessible to the mobile robot 110 and the fleet management system 120. The destination locations, in some embodiments, can be identified with respect to known objects or landmarks within the operating environment of the mobile robot 110. For example, the mobile robot 110 can identify the location of the object or landmark on an electronic map, and navigate to the object or landmark. In some embodiments, the object or landmark can relate to a visual target.

The fleet management system 120 can also receive data from the mobile robot 110. For example, the mobile robot 110 can transmit operating data about objects identified during its operation that appear inconsistent with the electronic map. The fleet management system 120 can receive the operating data and update the electronic map, as necessary. In the case that the identified object is obstructing the operation of the mobile robot 110, the fleet management system 120 can transmit updated navigation commands to the mobile robot 110 to guide the mobile robot 110 around the object.

Figure 2:
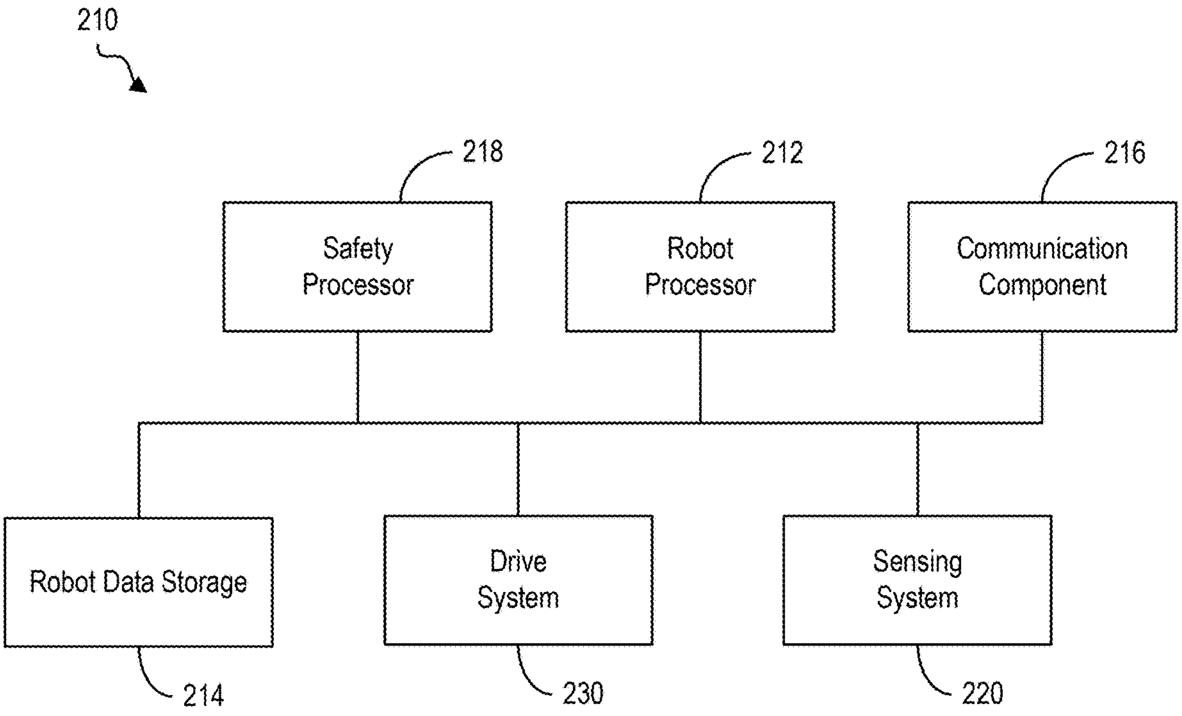
FIG. 2 is a block diagram of example components of an example mobile robot.

Referring now to FIG. 2, shown therein is a block diagram 200 of example components of an example mobile robot 210.

The mobile robot 210 can include a robot processor 212, a robot data storage 214, a communication component 216, a sensing system 220, and a drive system 230. Components 212, 214, 216, 218, 220, and 230 are illustrated separately in FIG. 2. In some embodiments, one or more of the components 212, 214, 216, 218, 220, and 230 can be combined into fewer components, or separated into further components. For example, the robot processor 212 and the safety processor 218 can be combined in the same component. In some embodiments, parts of a component can be combined with another part of another component.

The robot processor 212 and the safety processor 218 can each include any suitable processor, controller or digital signal processor that can provide sufficient processing power and reliability depending on the configuration, purposes and requirements of the mobile robot 210. In some embodiments, the robot processor 212 and the safety processor 218 can each include more than one processor with each processor being configured to perform different dedicated tasks.

The robot processor 212 and the safety processor 218 can each operate the robot data storage 214, the communication component 216, the sensing system 220, and the drive system 230. For example, the robot processor 212 and the safety processor 218 can each operate the drive system 230 to navigate to the waypoints or destination location as identified by a fleet management system, such as fleet management system 120. The robot processor 212 and the safety processor 218 can each also operate the drive system 230 to avoid collisions with objects detected in the mobile robot's proximity and bring the mobile robot to a stop, or rest position. The operation of the robot processor 212 and the safety processor 218 can each be based on data collected from the robot data storage 214, the communication component 216, the sensing system 220, and/or the drive system 230, in some embodiments.

Given waypoints or a destination location, the robot processor 212 can determine a trajectory to the destination location. A trajectory can be defined as a time-parameterized path and a path can be defined based on a series of positions, which may or may not include headings. Different trajectories can relate to the same path as a mobile robot 210 may follow the same path but at different speeds.

The robot data storage 214 can include RAM, ROM, one or more hard drives, one or more flash drives or some other suitable data storage elements such as disk drives, etc. For example, the robot data storage 214 can include volatile and non-volatile memory. Non-volatile memory can store computer programs consisting of computer-executable instructions, which can be loaded into the volatile memory for execution by the robot processor 212 or the safety processor 218. Operating the robot processor 212 to carry out a function can involve executing instructions (e.g., a software program) that can be stored in the robot data storage 214 and/or transmitting or receiving inputs and outputs via the communication component 216. The robot data storage 214 can also store data input to, or output from, the robot processor 212 or the safety processor 218, which can result from the course of executing the computer-executable instructions for example.

In some embodiments, the robot data storage 214 can store data related to the operation and calibration of the mobile robot 210, such as one or more calibration settings of the sensing system 220. The robot data storage 214 can store electronic maps of its operating environment, operating parameters, data tables, data processing algorithms (e.g., image processing algorithms), as well as other data and/or operating instructions which can be used by the robot processor 212 or the safety processor 218. The robot processor 212 and the safety processor 218 can each operate to process data received from the sensing system 220.

The communication component 216 can include any interface that enables the mobile robot 210 to communicate with other components, and external devices and systems. In some embodiments, the communication component 216 can include at least one of a serial port, a parallel port or a USB port. The communication component 216 may also include a wireless transmitter, receiver, or transceiver for communicating with a wireless communications network (e.g., using an IEEE 802.11 protocol or similar). The wireless communications network can include at least one of an Internet, Local Area Network (LAN), Ethernet, Firewire, modem or digital subscriber line connection. Various combinations of these elements may be incorporated within the communication component 216. For example, the communication component 216 may receive input from various input devices, such as a mouse, a keyboard, a touch screen, a thumbwheel, a track-pad, a track-ball, a card-reader, voice recognition software and the like depending on the requirements and implementation of the mobile robot 210. For example, the communication component 216 can receive commands and/or data from the fleet management system 120 and/or another mobile robot (e.g., another mobile robot operating within the operating environment).

The communication component 216 can receive information about obstacles and/or unexpected objects located in the mobile robot's operating environment directly from other mobile robots within the same operating environment and/or indirectly via the fleet management system 120. The robot processor 212 can update an electronic map stored in the robot data storage 214 with this information, for example. The robot processor 212 may also transmit, via the communication component 216 for example, information related to obstacles and/or unexpected objects identified in its operating environment to other mobile robots directly or indirectly via the fleet management system 120.

The sensing system 220 can monitor the environment of the mobile robot 210. The sensing system 220 can include one or more sensors for capturing information related to the environment. The information captured by the sensing system 220 can be applied for various purposes, such as localization, navigation, mapping and/or collision avoidance. For example, the sensing system 220 can include optical sensors equipped with depth perception capabilities, infrared (IR) capabilities, or sonar capabilities. The optical sensors can include imaging sensors (e.g., mono and/or stereo photographic and/or video cameras), and range-finding sensors (e.g., time of flight sensors, Light Detection and Ranging (LiDAR) devices which generate and detect reflections of pulsed laser from objects proximal to the mobile robot 210, etc.). The sensing system 220 can also include navigational sensors, such as ground positioning system (GPS) sensors, as well as sensors that detect guiding infrastructure installed within the operating environment. Example sensors that detect guiding infrastructure can include, but not limited to, magnetic sensors that detect magnetic tape within a facility warehouse, and/or optical sensors that detect visual navigational indicators within the operating environment. The sensing system 220 can include proximity sensors that detect people within a proximity of the mobile robot 210.

The sensing system 220 can also monitor the operation of the mobile robot 210. The sensing system 220 can include example sensors, such as encoders, arranged to measure the speed of a wheel of the mobile robot 210, the traction of the mobile robot 210, or the tilt angle of the mobile robot 210. In some embodiments, encoders are provided for each wheel. On tricycle mobile robots, encoders can measure the steering angle along with the drive velocity. The sensing system 220 can include sensors to measure the presence, the mass, or the type of a payload of the mobile robot 210.

The sensing system 220 can monitor continuous variables and/or discrete variables. For example, continuous variables can relate to speed, velocity, traction, steering angle, tilt angle, and/or payload mass measurements while discrete variables can relate to the presence of a payload, the type of payload, and/or the presence of a human within a proximity of the mobile robot 210.

The sensing system 220 can include one or more components that control the operation of the sensors. For example, the components can include, but is not limited to, one or more processors, programmable logic controllers (PLCs), motor contactors, and/or relays. In some embodiments, the sensing processors can receive data collected by the sensors and process the collected data. The sensing processors can operate independently from the robot processor 212 and the safety processor 218. In some embodiments, the sensing system 220 can receive the data collected by the sensors and transmit the collected data to the robot processor 212 and the safety processor 218 for processing. In other embodiments, the sensing system 220 can directly incorporate functionality from the safety processor 218.

The drive system 230 can include the components required for steering and driving the mobile robot 210. For example, the drive system 230 can include the steering component and drive motor.

Figure 3:
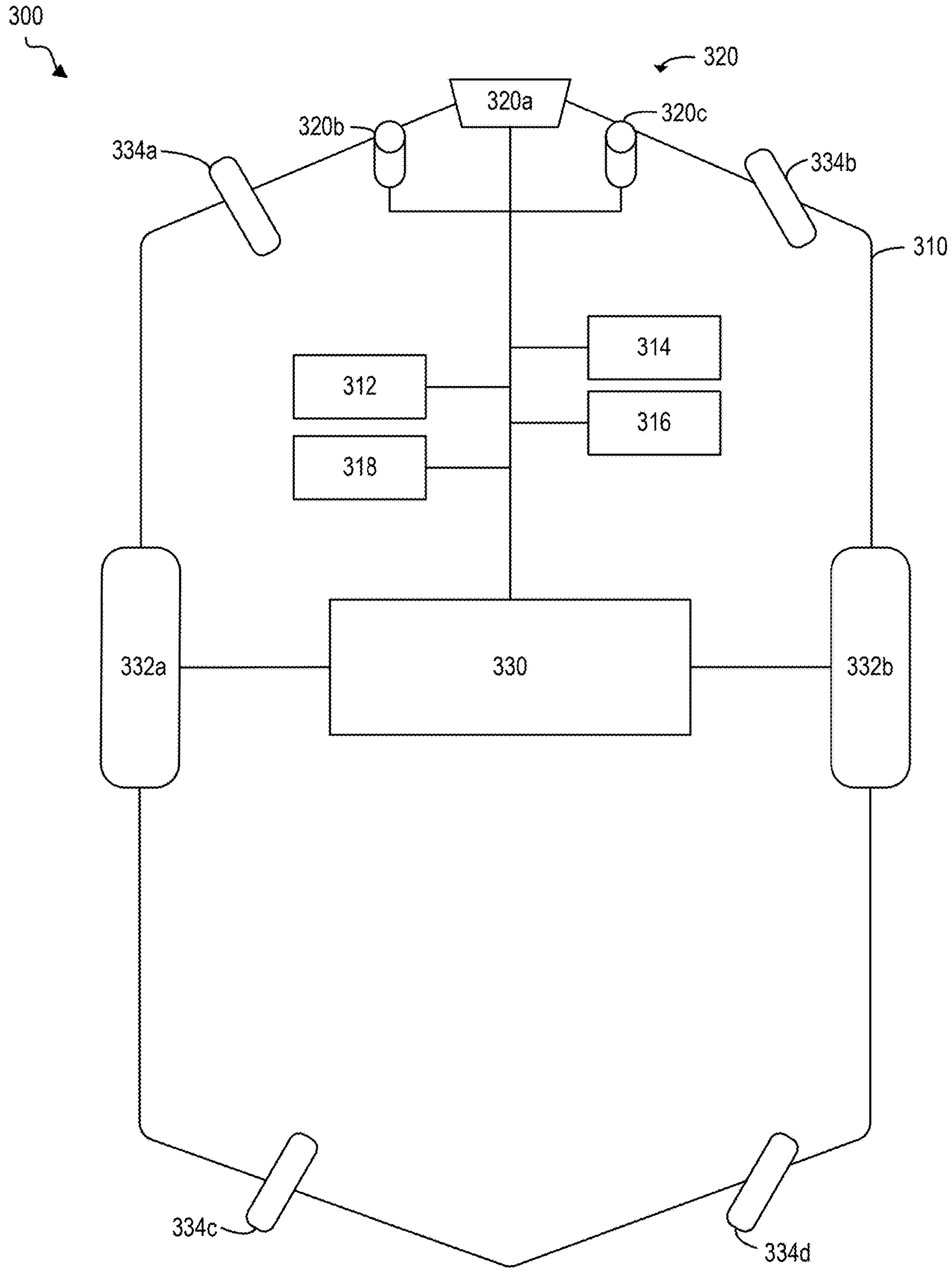
FIG. 3 is a block diagram of example components of another example mobile robot.

Referring now to FIG. 3, shown therein is a block diagram 300 of example components of another example mobile robot 310. The mobile robot 310 shown in FIG. 3 can act as a mobile robot for transporting objects between different locations. The mobile robot 310 can include a cargo component for carrying loads. For example, the cargo component can be a flatbed or a bucket having sidewalls to prevent loads from falling out as the mobile robot 310 moves. The mobile robot 310 can include cargo securing mechanisms to secure the load and prevent the load from falling off the mobile robot 310. The mobile robot 310 can include flexible components, which may be removed from the mobile robot 310. For example, a cargo securing mechanism may be removable when not in use. Although the mobile robot 310 can act as a transport robot, the mobile robot 310 is not limited to transporting objects.

Similar to the mobile robot 210 of FIG. 2, the mobile robot 310 includes a drive system 330, a sensing system 320, a robot processor 312, a robot data storage 314, a communication component 316, and a safety processor 318.

The drive system 330 includes a motor and/or brakes connected to drive wheels 332*a* and 332*b* for driving the mobile robot 310. The motor can be, but is not limited to, an electric motor, a combustion engine, or a combination/hybrid thereof. Depending on the application of the mobile robot 310, the drive system 330 may also include control interfaces that can be used for controlling the drive system 330. For example, the drive system 330 may be controlled to drive the drive wheel 332*a* at a different speed than the drive wheel 332*b* in order to turn the mobile robot 310. Different embodiments may use different numbers of drive wheels, such as two, three, four, etc.

A number of wheels 334 may be included. The mobile robot 310 includes wheels 334*a*, 334*b*, 334*c*, and 334*d*. The wheels 234 may be wheels that are capable of allowing the mobile robot 310 to turn, such as castors, omni-directional wheels, and mecanum wheels. In some embodiments, the mobile robot 310 can be equipped with special tires for rugged surfaces or particular floor surfaces unique to its environment.

The sensing system 320 in FIG. 3 includes example sensors 320*a*, 320*b*, and 320*c*. The sensors 320*a*, 320*b*, 320*c* can include, but are not limited to, optical sensors arranged to provide three-dimensional (e.g., binocular or RGB-D) imaging, two-dimensional laser scanners, and three-dimensional laser scanner. For example, sensors 320*a*, 320*b* can be a pair of stereo imaging devices.

The positions of the components 334, 320, 340, 330, 332 of the mobile robot 310 is shown for illustrative purposes and are not limited to the illustrated positions. Other configurations of the components 334, 320, 340, 330, 332 can be used depending on the application of the mobile robot 310 and/or the environment in which the mobile robot 310 will be used.

Figure 4A:
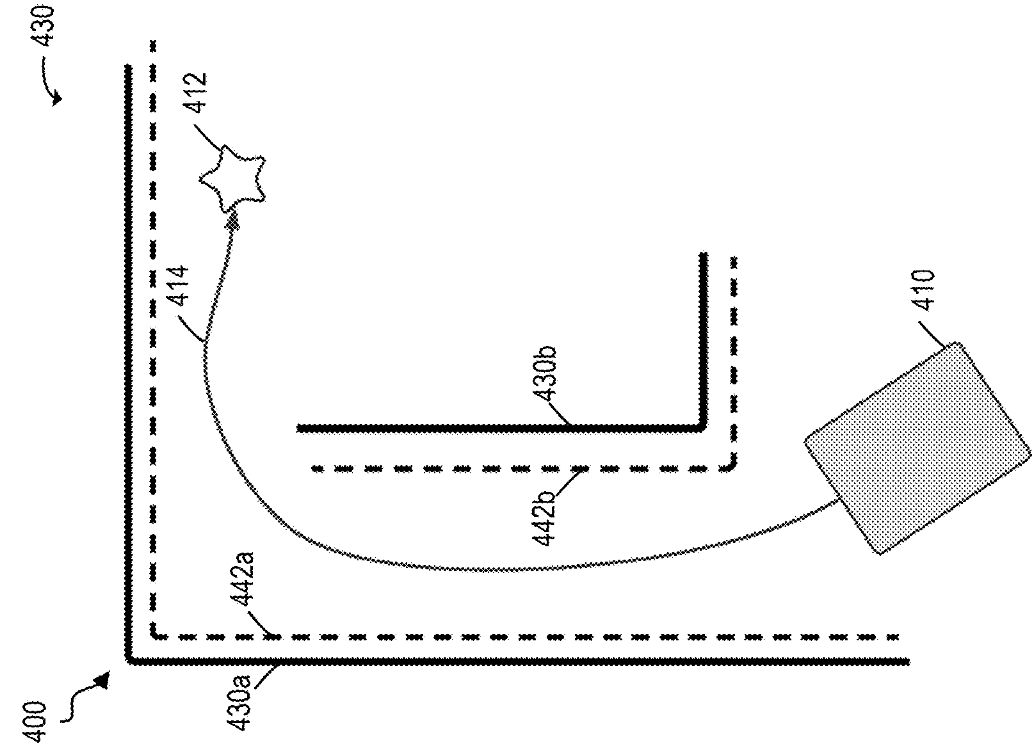
FIG. 4A is a diagram illustrating an example mobile robot's perception of its environment based on a poorly calibrated stereo imaging devices.

Referring now to FIG. 4A, shown therein is a diagram 400 of an example mobile robot 410 navigating to an example destination location 412 within an environment. As shown in diagram 400, a portion of the environment can include objects 430. The objects 430 can be static objects, such as but not limited to walls 430*a*, 430*b*, shelves, equipment or other structures. The objects 430 can be dynamic objects, such as but not limited to humans, other mobile robots, or other moving vehicles or equipment.

Although not shown, the mobile robot 410 can include a robot processor 212, 312 and a safety processor 218, 318 similar to the mobile robots 210 and 310 of FIG. 2 and FIG. 3, respectively. The mobile robot 410 can have a sensing system 220 that includes at least a pair of stereo imaging devices 320*a*, 320*b* mounted thereon. As the mobile robot 410 travels along a planned trajectory, the sensing system 220 can monitor the environment of the mobile robot 410 to detect objects 430 that poses a collision risk (i.e., a potential collision object 430). Upon detection of a potential collision object 430, the safety processor 218, 318 can adjust the trajectory of the mobile robot 410 to avoid with the detected object 430.

As shown in diagram 400 of FIG. 4A, the mobile robot 410 can plan a trajectory 414 to travel to destination location 412 that includes traveling along a corridor defined between walls 430*a* and 430*b*. However, poorly calibrated stereo imaging devices 320*a*, 320*b* of the sensing system 220 can result in the walls 430*a*, 430*b* being detected as having a position 442*a*, 442*b* (shown in dashed lines) instead of the actual position (shown in solid lines). As can be seen in FIG. 4A, position 442*a*, 442*b* deviates from the actual position of walls 430*a*, 430*b*. The monitoring data collected with poorly calibrated imaging devices in diagram 400 can have such a deviation from reality that the mobile robot 410 may determine that the corridor is too narrow, despite actually having enough space in reality. This results in an underutilization of space in the environment.

Further, the mobile robot 410 can determine that continuing along the planned trajectory 414 would result in a collision with the walls 430*a*, 430*b*, and the mobile robot 410 may adjust the planned trajectory 414. The mobile robot 410 may determine another, less efficient, trajectory to arrive at the destination location 412, or the mobile robot 410 may determine that it is unable to safely arrive at the destination location 412 (i.e., unable to complete its mission).

Figure 4B:
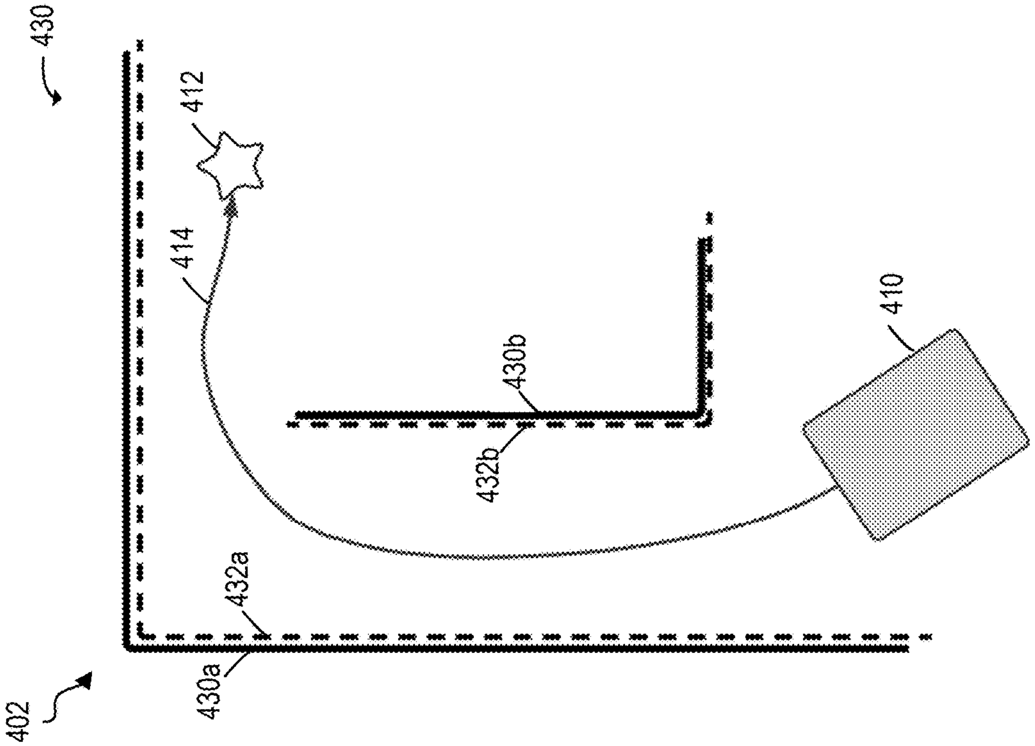
FIG. 4B is a diagram illustrating an example mobile robot's perception of its environment based on a better calibrated stereo imaging devices than that of FIG. 4A.

In contrast, diagram 402 of FIG. 4B illustrates the position detected with better calibrated imaging devices. As shown in FIG. 4B, better calibrated stereo imaging devices 320*a*, 320*b* of the sensing system 220, can detect walls 430*a*, 430*b* as having a position 432*a*, 432*b* (shown in dashed lines). In some embodiments, the position 432*a*, 432*b* can align with the position of the walls 430*a*, 430*b* detected by LiDAR devices of the sensing system of the mobile robot 410.

Although position 432*a*, 432*b* may not match exactly with the actual position of walls 430*a*, 430*b*, the deviation of detected position 432*a*, 432*b* from the actual position of walls 430*a*, 430*b* is less than the deviation of detected position 442*a*, 442*b* from the actual position of walls 430*a*, 430*b*. The monitoring data collected with better calibrated imaging devices in diagram 402 can allow the mobile robot 410 to determine that the corridor is wide enough to pass through without collision, and continue along the planned trajectory 414.

Figure 5:
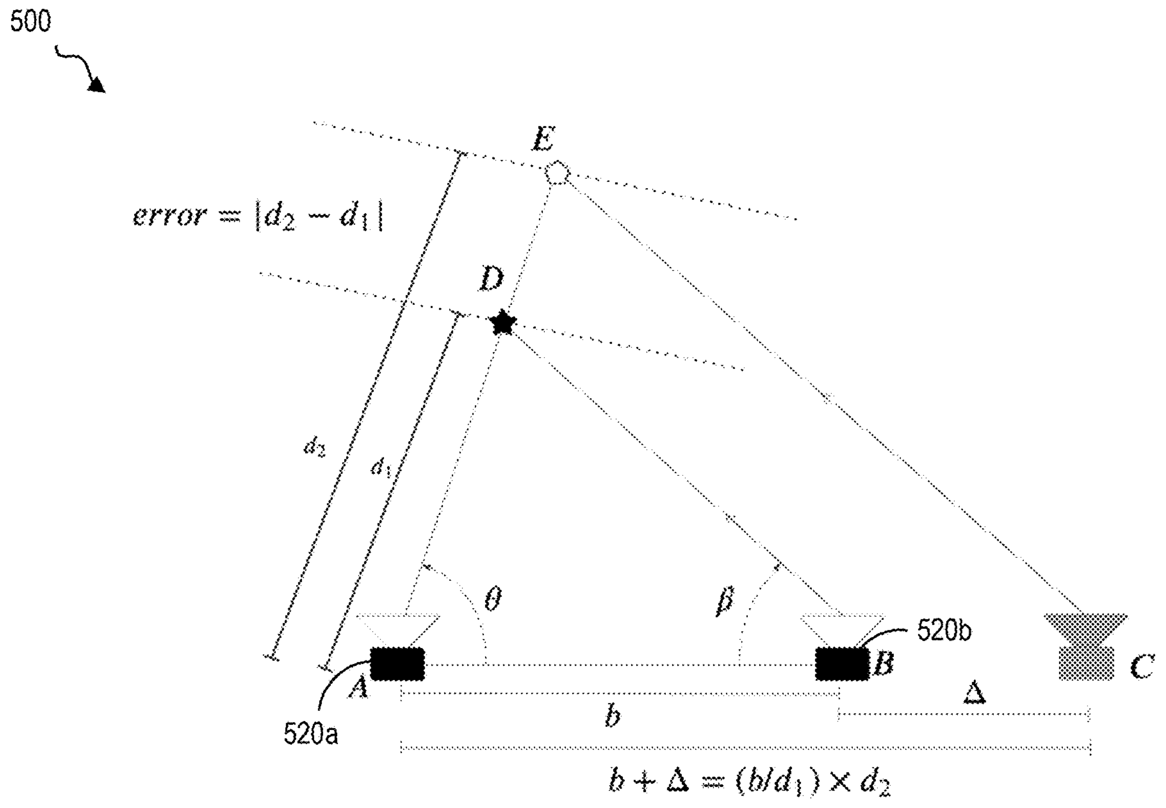
FIG. 5 is a diagram illustrating an example calibrated baseline distance and an example actual baseline distance between an example pair of stereo imaging devices.

Referring now to FIG. 5, shown therein is a diagram of an example pair of stereo imaging devices 520*a*, 520*b*. The pair of stereo imaging devices can be mounted on a mobile robot, such as imaging devices 320*a*, 320*b* mounted on mobile robot 310. For example a first imaging device 520*a* can be mounted at position A and second imaging device 520*b* can be mounted at position B. The pair of stereo imaging devices 520*a*, 520*b* at positions A and C, respectively can detect objects at point D having a depth ($d_1$).

The determination of depth ($d_1$) can be based on the calibration of the stereo imaging devices 520*a*, 520*b*, such as baseline distance (b) between imaging devices 520*a*, 520*b* of the pair of stereo imaging devices. The baseline distance (b) can be representative of the distance between position A of the first imaging device 520*a* and position B of the second imaging device 520*b*. The baseline distance (b) can be pre-determined manually, for example, upon deployment, installation, or maintenance. The pre-determined baseline distance (b) between imaging devices 520*a*, 520*b* of the pair of stereo imaging devices can be stored in memory 214, 314.

Overtime, the position of one or both of the imaging devices 520*a*, 520*b* can change. For example, the position of the second imaging device 520*b* can change to position C. As a result, the baseline distance between the pair of stereo imaging devices A, B can change from (b) to (b+Δ). As shown in FIG. 5, the pair of stereo imaging devices 520*a*, 520*b* at positions A and C, respectively can detect objects at point E, having a depth of ($d_2$). The discrepancy (Δ) between the stored baseline distance (b) between the imaging devices 520*a*, 520*b* and the actual baseline distance (b+Δ) can result in an inaccurate perception of reality—that is, the error between $d_2$ and $d_1$.

Whether one or both imaging devices have changed position, the baseline distance (b) relates to the distance between imaging devices 520*a*, 520*b*. Accordingly, to determine the actual baseline distance (b+Δ) it can be assumed that one imaging device remains in the same position and the other imaging device has changed. For example, although FIG. 5 shows the position of the second imaging device 520*b* having changed position and the first imaging device maintaining the same position, in other embodiments, it can be assumed the position of the second imaging device 520*b* maintains the same position while the position of the first imaging device 520*a* changes position.

Figure 6A:
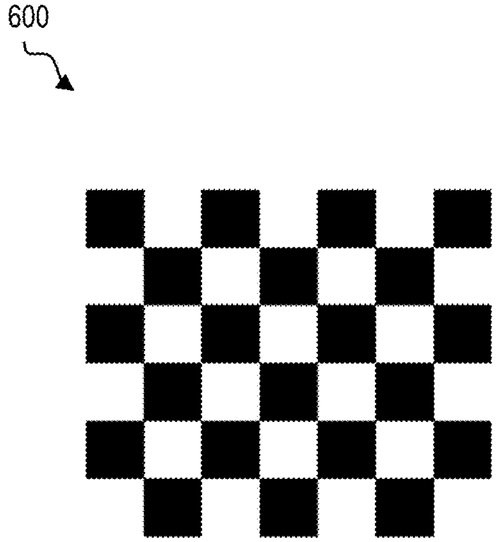
FIG. 6A is an example visual target, according to an example embodiment.

Referring now to FIG. 6A, shown therein is an example visual target 600 for providing points of reference for calibration. As shown, example visual target 600 can be a chessboard. Although visual target 600 is shown as being a rectangle with 7×6 dimensions, the chessboard can be larger or smaller in one or both dimensions (e.g., 7×8, or 5×4). Further, the visual target 600 can have any shape and is not limited to a rectangular shape.

Figure 6B:
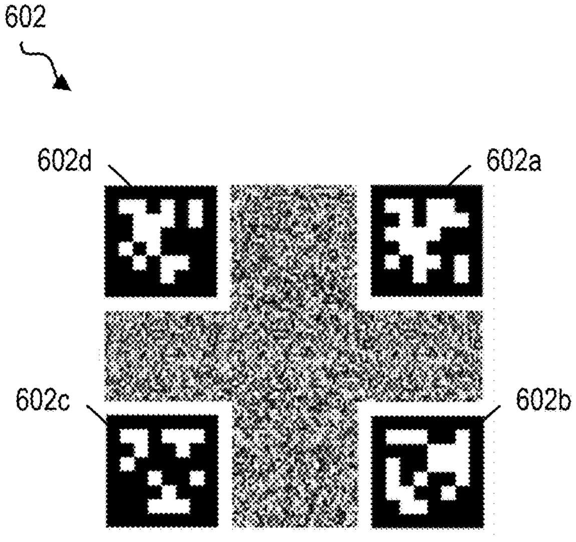
FIG. 6B is another example visual target, according to another embodiment.

Referring now to FIG. 6B, shown therein is another example visual target 602. As shown, example visual target 602 can be a custom pseudo random pattern. Further, example visual target 602 can include AprilTags 602*a*, 602*b*, 602*c*, and 602*d*. Although visual target 602 is shown as having AprilTags in each of four corners of a square, the visual target 602 can include fewer or more AprilTags, the AprilTags can be located in the same or different positions within the visual target 602, or the visual target 602 can have another shape. As shown, visual target 602 has more image texture than visual target 600. Generally, more image texture can provide more points of reference.

Figure 7:
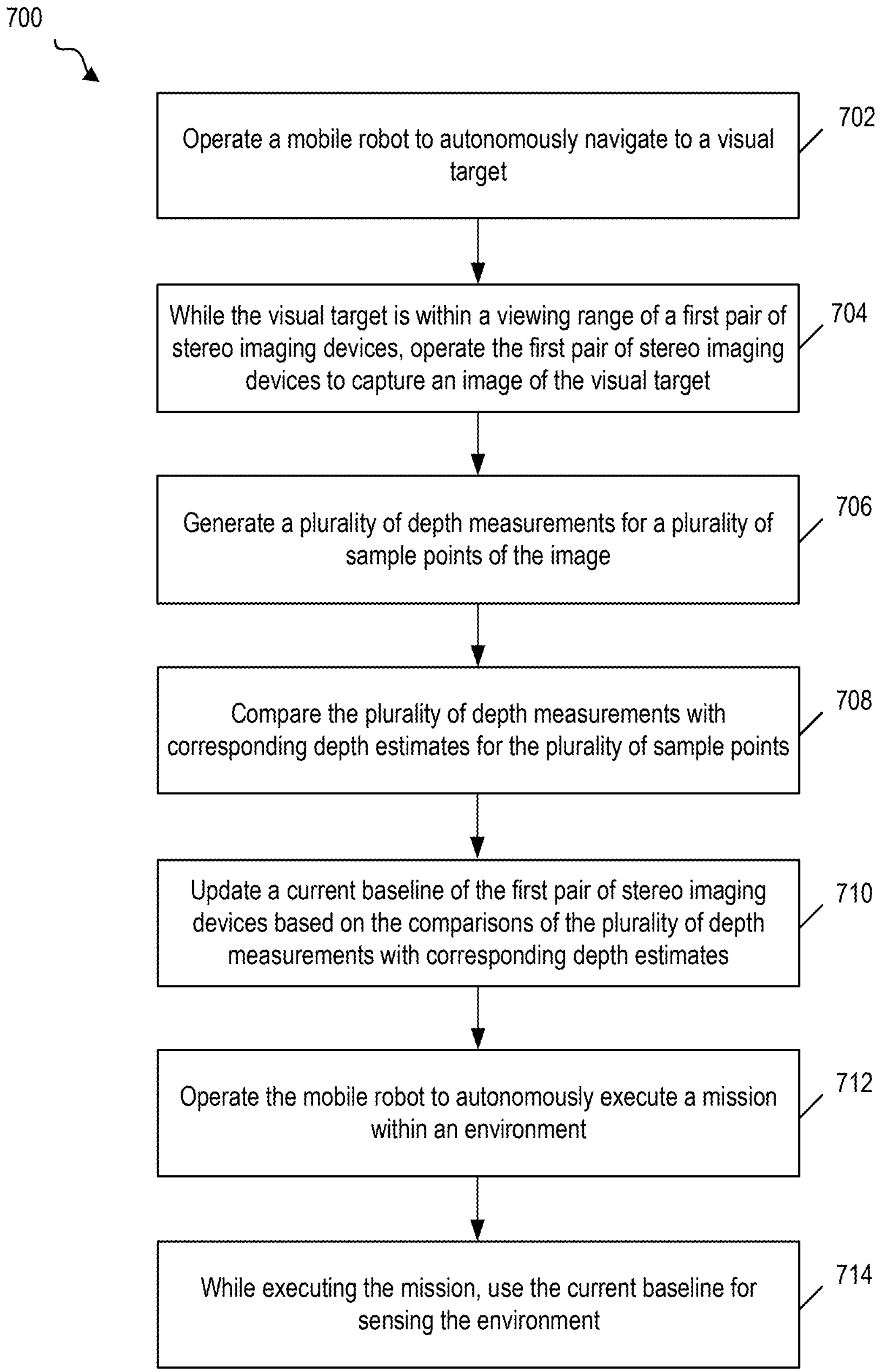
FIG. 7 is a flowchart of an example method for operating a mobile robot.

Referring now to FIG. 7, which is a flowchart of an example method 700 for operating a mobile robot. To assist with the description of method 700, reference will be made simultaneously to FIGS. 5, 6A, 6B, 8, 9A, 9B, 10, 11, and 12A to 12C.

Figure 8:
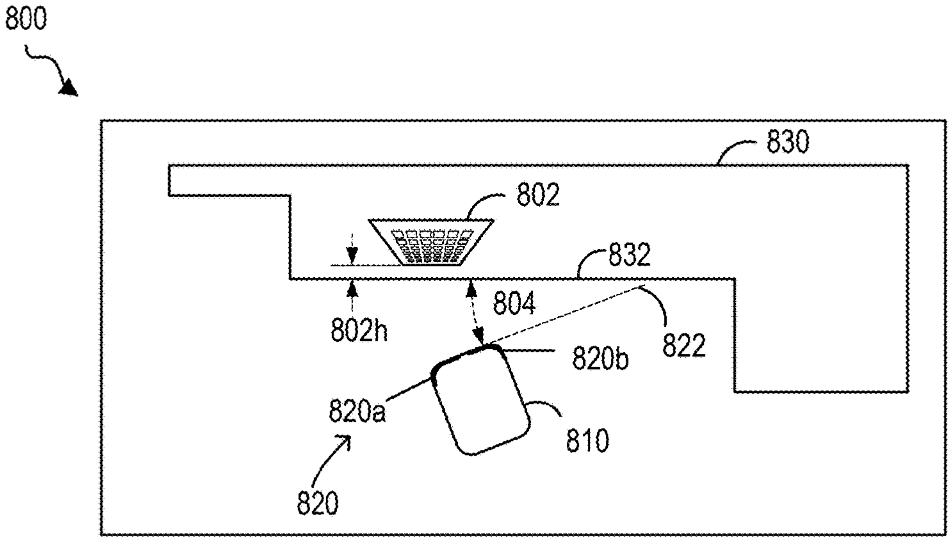
FIG. 8 is a diagram illustrating an example robot that has navigated to an example visual target, according to an example embodiment.

At 702, the mobile robot 810 autonomously navigates to a visual target 802. FIG. 8 shows an illustration 800 of an example mobile robot 810 that has navigated to a visual target 802. Although the following description will refer to mobile robot 810, the mobile robot 810 can be any mobile robot, such as mobile robots 110, 210, 310, or 410. The mobile robot 810 can include a robot processor, such as robot processor 212 or 312, a robot data storage 214 or 314, and a sensing system, such as sensing system 220 or 320. The sensing system 820 can include at least a pair of stereo imaging devices 820*a*, 820*b* mounted thereon the mobile robot 810. The pair of stereo imaging devices 820*a*, 820*b* can be any pair of stereo imaging devices, such as imaging devices 520*a*, 520*b*. The robot data storage 214, 314 can store a current baseline (b) for the pair of stereo imaging devices 820*a*, 820*b*. The current baseline can be representative of a distance between the first imaging device 820*a* and the second imaging device 820*b*. Further, the pair of stereo imaging devices 820*a*, 820*b* can define a longitudinal axis 822.

The visual target 802 can be any planar (e.g., two-dimensional) fiducial marker that provides reference points, such as visual targets 600 and 602. One or more visual targets 802 can be made available within the environment that mobile robot 810 operates. For example, the visual target 802 can be located on a wall 830. The location of the visual target 802 within the environment can be defined in an electronic map saved in the robot data storage 214.

At 704, while the visual target 802 is within a viewing range of the pair of stereo imaging devices 820*a*, 820*b*, the pair of stereo imaging device 820*a*, 820*b* can operate to capture an image of the visual target 802. The image can include a plurality of sample points generated based on the visual target 802. That is, the image can include a plurality of pixels generated based on the appearance of the visual target 802.

In some embodiments, the mobile robot 810 can park in front of the visual target 802 to capture the image of the visual target 802 at 704. That is, the mobile robot 810 can be stationary while the pair of stereo imaging devices 820*a*, 820*b* capture the image of the visual target 802. In some embodiments, the mobile robot 810 can further remain stationary until the baseline distance is updated. In other embodiments, the mobile robot 810 may not remain stationary until the baseline distance is updated. For example, the mobile robot 810 may move after the image is captured at 704.

In some embodiments, the mobile robot 810 can position itself to capture the image without the pair of stereo imaging devices 820*a*, 820*b* being parallel to the visual target 802. That is, the longitudinal axis 822 defined by the pair of stereo imaging devices 820*a*, 820*b* can be non-parallel to a plane 832 defined by the visual target 802. As shown in illustration 800, the angle 804 between longitudinal axis 822 defined by the pair of stereo imaging devices 820*a*, 820*b* and the plane 832 defined by the visual target 802 can be an acute angle.

The viewing range of the pair of stereo imaging devices 820*a*, 820*b* can include a maximum distance and a minimum distance. That is, the visual target 802 can be outside of the viewing range of the imaging devices 820*a*, 820*b* on account of the mobile robot 810 being too far from or too close to the visual target 802. That being said, the mobile robot 100 can autonomously navigate to any number of locations or positions with the visual target 802 being within the viewing range of the stereo imaging devices 820*a*, 820*b*. That is, the visual target 802 does not need to be in a precise location within the viewing range of the pair of stereo imaging devices 820*a*, 820*b*. Accordingly, the mobile robot 810 does not need to be in a precise location with respect to the visual target 802.

For example, the maximum distance of the viewing range of the imaging devices 820*a*, 820*b* can be 5 meters. In some embodiments, the maximum distance of the viewing range of the imaging devices 820*a*, 820*b* can be 4.5 meters. In some embodiments, the maximum distance of the viewing range of the imaging devices 820*a*, 820*b* can be 3 meters. The mobile robot 810 can autonomously navigate to a pre-determined proximity to the visual target 802 that is less than the maximum distance. For example, mobile robot 810 can autonomously navigate to less than 3 meters from the visual target 802.

As shown in illustration 800, the visual target 802 can be mounted on a wall 830 with a bottom of the visual target 802 having a height of 802*h* from the ground. Meanwhile, the mobile robot 810 can travel on the ground and the stereo imaging devices 820*a*, 820*b* can have a particular height from the ground. In some embodiments, the height of the stereo imaging devices 820*a*, 820*b* can be lower than the height 802*h* of the bottom of the visual target 802. At close distances, the visual target 802, which is at a higher elevation than the stereo imaging devices 820*a*, 820*b* may not be within the viewing range of the stereo imaging devices 820*a*, 820*b*. In order to capture an image of the visual target 802, the mobile robot 810 may need to be far enough from the visual target 802 for the visual target 802 to be within the viewing range of the imaging devices 820*a*, 820*b*. The viewing range of the imaging devices 820*a*, 820*b* can be based on a tilt of the imaging devices 820*a*, 820*b*. For example, imaging devices 820*a*, 820*b* having an upward tilt may not require as much distance from an elevated visual target 802 to capture an image of that elevated visual target 802 compared to the distance required for imaging devices 820*a*, 820*b* without an upward tilt.

The viewing range of the imaging devices 820*a*, 820*b* can also be based on the baseline distance between the imaging devise 820*a*, 820*b*. At close distances, the visual target 802 may not be within the viewing range of both imaging devices 820*a*, 820*b* of the pair of stereo imaging devices 820*a*, 820*b*. For example, the visual target 802 can be within the viewing range of one imaging device 820*a* but not the viewing range of another imaging device 820*b* of the pair of stereo imaging devices 820*a*, 820*b*. In order to capture an image of the visual target 802, the mobile robot 810 may need to be far enough from the visual target 802 for the visual target 802 to be within the viewing range of both the imaging devices 820*a*, 820*b*.

In addition, the viewing range of the imaging devices 820*a*, 820*b* can be based on a size, or dimensions of the visual target 802. The mobile robot 810 can autonomously navigate to a pre-determined proximity to the visual target 802 that is greater than the minimum distance. For example, mobile robot 810 can autonomously navigate to more than 0.5 meters from the visual target 802.

Figure 9A:
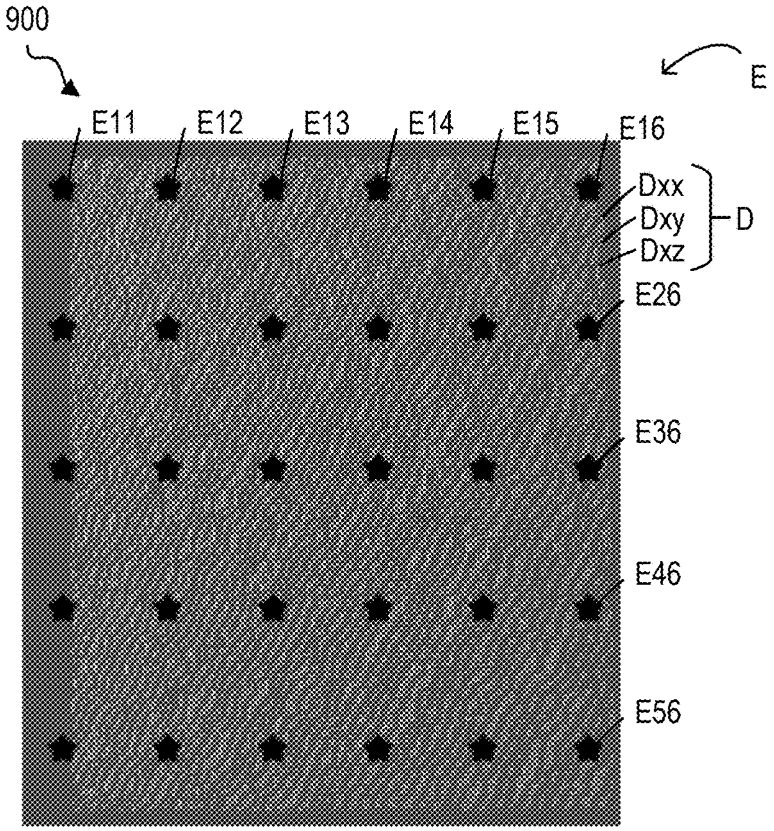
FIG. 9A is a top view diagram illustrating example depth estimates of an example visual target and example depth measurements generated from an image of the example visual target, according to an example embodiment.
Figure 9B:
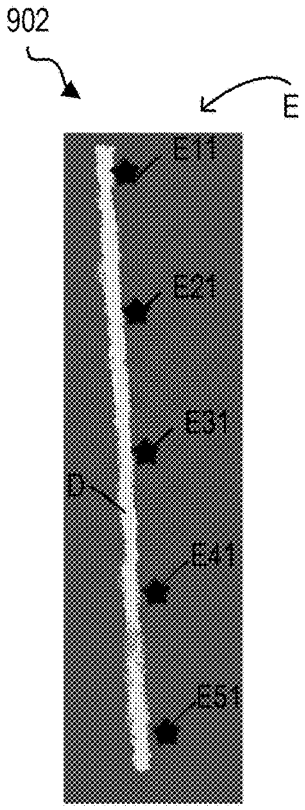
FIG. 9B is a side view diagram of the depth estimates and depth measurements of FIG. 9A.

At 706, the robot processor 212, 312 can generate a plurality of depth measurements E for the plurality of sample points of the image. Referring now to FIG. 9A and FIG. 9B, shown therein is a front view illustration 900 and a side view illustration 902 of the plurality of sample points E11, E12, E13, E14, E15, E16, E21, . . . , E26, E31, . . . , E36, E41, . . . , E46, E51, . . . , E56 generated based on the visual target 802. The depth measurements E for the sample points of the image can be determined based on dimensions of the visual target 802, which can also be stored in the robot data storage 214, 314, or the system data storage 140.

At 708, the robot processor 212, 312 can compare the plurality of depth measurements E with corresponding depth estimates D for the plurality of sample points. The depth estimates D are also shown in illustrations 900 and 902 in the form of a point cloud representation of the visual target 802 shown in the image—that is, a point cloud representation of the visual target 802 in the camera frame. The point cloud representation of the visual target 802 includes a plurality of sample points Dxx, Dxy, Dxz. The depth measurements E can be generated based on the current baseline (b) stored in the robot data storage 214, 314 for pair of stereo imaging devices 820*a*, 820*b*.

In some embodiments, the robot processor 212, 312 can estimate a pose of the visual target 802 shown in the image based on the known dimensions of the visual target. The robot processor 212, 312 can then generate the plurality of depth estimates D for the plurality of sample points based on the estimated pose of the visual target 802 shown in the image.

As can be seen in FIG. 9B, the depth estimates D may not align with the depth measurements E. Further, the error between the depth estimates D and the depth measurements E can vary amongst the plurality of sample points. For example, the error of the depth estimate D around E51 is greater than the error of the depth estimate D around E11. The robot processor 212, 312 can determine a point difference between the depth measurement E and the depth estimates D for each sample point.

Figure 10:
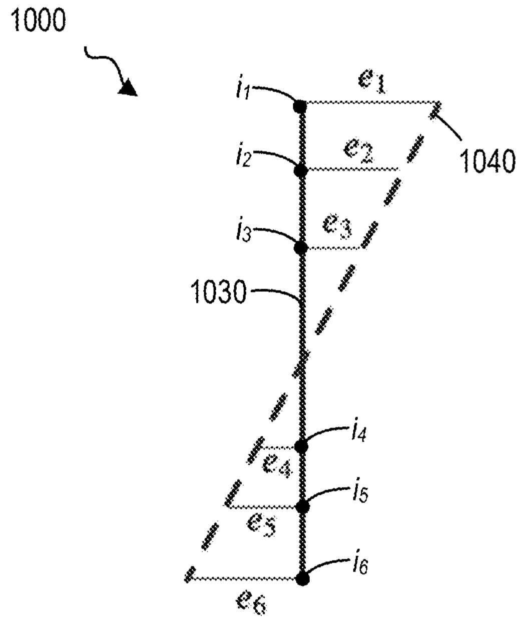
FIG. 10 is a diagram illustrating point differences between the depth measurements and the depth estimates for a plurality of sample points, according to an example embodiment.

Referring now to FIG. 10, shown therein is an illustration 1000 of the errors $e_1$, $e_2$, $e_3$, $e_4$, $e_5$, and $e_6$ between the depth measurements 1030 and the depth estimates 1040 for sample points $i_1$, $i_2$, $i_3$, $i_4$, $i_5$, and $i_6$. The depth estimates 1040 can be generated from the visual plane—that is the visual target 802 shown in the image and the known dimensions of the visual target 802. The depth measurements 1030 can be generated from a current depth plane, that is, based the current baseline distance.

Figure 11:
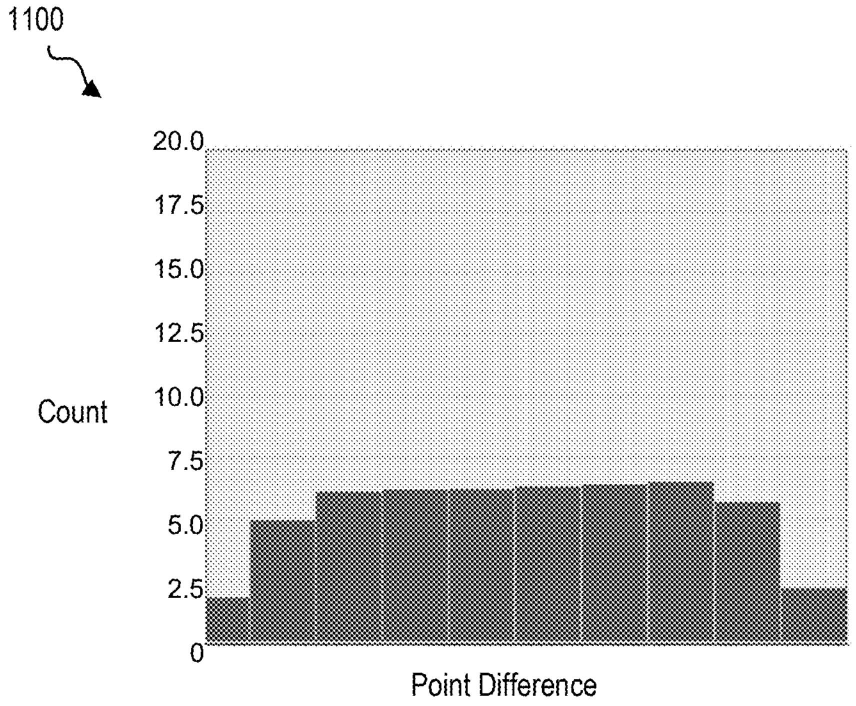
FIG. 11 is an plot illustrating an example distribution of point differences between the depth measurements and the depth estimates for a plurality of sample points, according to an example embodiment.

Referring now to FIG. 11, shown therein a histogram 1100 of all errors, that is all point differences from the plurality of sample points generated from the visual target 802. The plurality of sample points generated from the visual target 802 can be all sample points generated in the captured image. In some embodiments, the plurality of sample points generated in the captured image can include all sample points across the entire visual target 802. In some embodiments, the plurality of sample points generated in the captured image can be a portion of sample points across the entire visual target 802. The distribution of all errors can be seen in the histogram 1100.

The robot processor 212, 312 can determine a mean error between the depth measurements 1030 and the depth estimates 1040 using Equation (1). The robot processor 212, 312 can also determine a variance of the errors using Equation (2).

$$E = \sum_{i=1}^{N} e_i \quad \text{Equation (1)}$$

$$\sigma = \frac{\sum_{i=1}^{N} E - e_i}{N} \quad \text{Equation (2)}$$

Based on the error and variance determined from Equation (1) and (2) respectively, the robot processor 212, 312 can determine whether or not to proceed with updating the baseline distance at 710. For example, if the error and variance are less than pre-determined thresholds, the robot processor 212, 312 may not decide not to update the baseline distance at.

In some embodiments, the robot processor 212, 312 can generate additional metrics to determine whether or not to update the baseline distance at 710. For example, the robot processor 212, 312 can determine whether the distribution of all errors of the image is similar to a Gaussian distribution. When the distribution of all errors is similar to a Gaussian distribution, the mean of the errors can be an accurate parameter to minimize. Accordingly, the robot processor 212, 312 can proceed with updating the baseline distance at 710.

At 710, the robot processor 212, 312 can update the current baseline (b) based on the comparisons of the plurality of depth measurements E with the corresponding depth estimates D at 708. In some embodiments, the robot processor 212, 312 can determine an average of the point differences between the depth measurement E and the depth estimates D for the plurality of sample points. In some embodiments, the mean of the plurality of point differences can be taken as the average. The robot processor 212, 312 can determine an updated baseline distance that minimizes the mean of the point difference between the depth measurement E and the depth estimate D for all sample points.

Figure 12A:
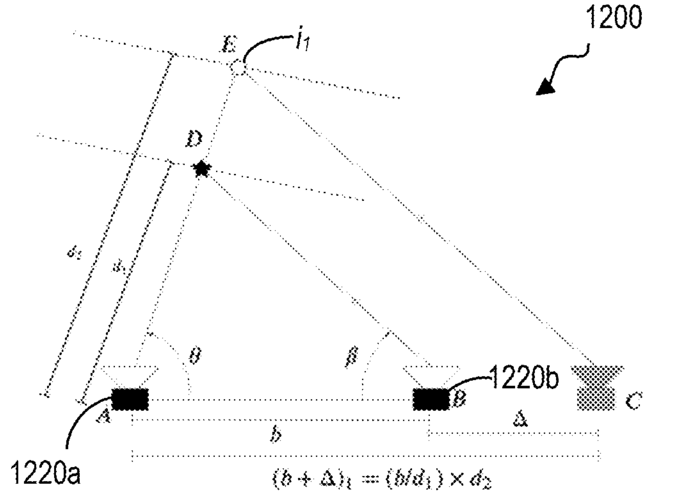
FIG. 12A is a diagram of an example updated baseline distance between a pair of stereo imaging devices for an example sample point, according to an example embodiment.
Figure 12B:
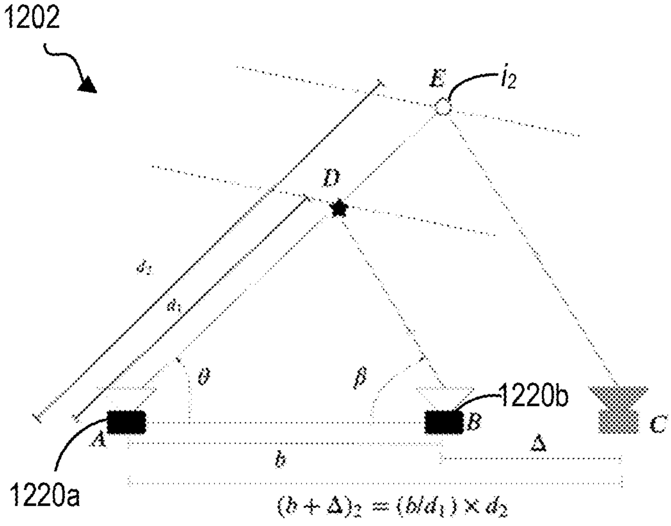
FIG. 12B is a diagram of an example updated baseline distance between the pair of stereo imaging devices of FIG. 12A for another example sample point.
Figure 12C:
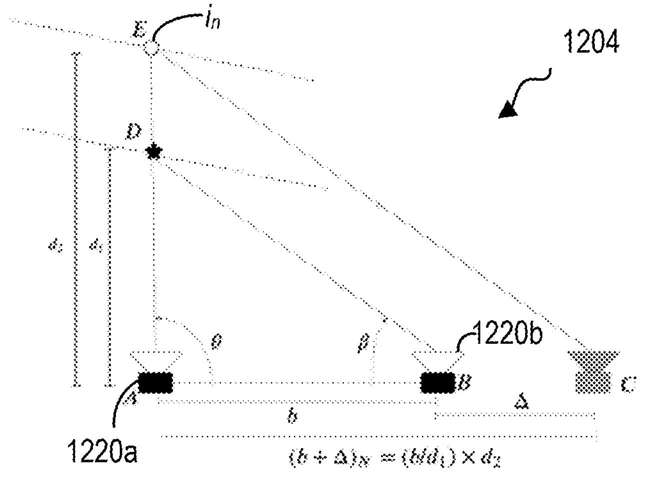
FIG. 12C is a diagram of an example updated baseline distance between the pair of stereo imaging devices of FIG. 12A for another example sample point.

In some embodiments, the robot processor 212, 312 can determine an updated baseline distance for each sample point of the image. Referring now to FIG. 12A, FIG. 12B, and FIG. 12C, shown therein are illustrations 1200, 1202, 1204 of the updated baseline distance determined from various sample points $i_1$, $i_2$, . . . $i_n$, respectively. The robot processor 212, 312 can determine an average updated baseline distance for all sample points from Equation (3) and use the average updated baseline distance for all sample points as the updated baseline distance (b+Δ) for the imaging devices 1220*a*, 1220*b*. The updated baseline distance (b+Δ) for the imaging devices 1220*a*, 1220*b* can be stored in the robot data storage 214, 314.

$$b + \Delta = \frac{\sum_{i=1}^{N} (b + \Delta)_i}{N} \quad \text{Equation (3)}$$

In some embodiments, the updated baseline distance (b+Δ) can be the same baseline distance (b) as that at 708. That is, the position of stereo imaging devices 1220*a*, 1220 may not have changed. In some embodiments, the updated baseline distance (b+Δ) can be different from the baseline distance (b) at 708.

At 712, the mobile robot 810 can autonomously execute a mission within an environment. For example, the mobile robot 810 can determine a destination location associated with the mission and plan a trajectory from its current location to the destination location. In some embodiments, the mobile robot 810 may have remained stationary at the visual target 802 until the baseline distance is updated at 710 and so the current location of the mobile robot 810 can be proximal to the visual target 802.

At 714, while executing the mission, the robot processor 212, 312 can use the current baseline distance, that is the updated baseline distance (b+Δ) for sensing the environment.

The method 700 can be performed on demand as necessary. For example, method 700 can be performed for troubleshooting purposes. The method 700 can also be performed based on a routine schedule (whether time based or other frequency). For example, method 700 can be performed to validate the accuracy of the existing calibration of stereo imaging devices 820*a*, 820*b*. In such cases, the updated baseline distance (b+Δ) at 710 may turn out to be the same as the baseline distance (b) at 708. Overtime, collection of data from the method 700 can be used to understand the alignment of the imaging devices.

Figure 13:
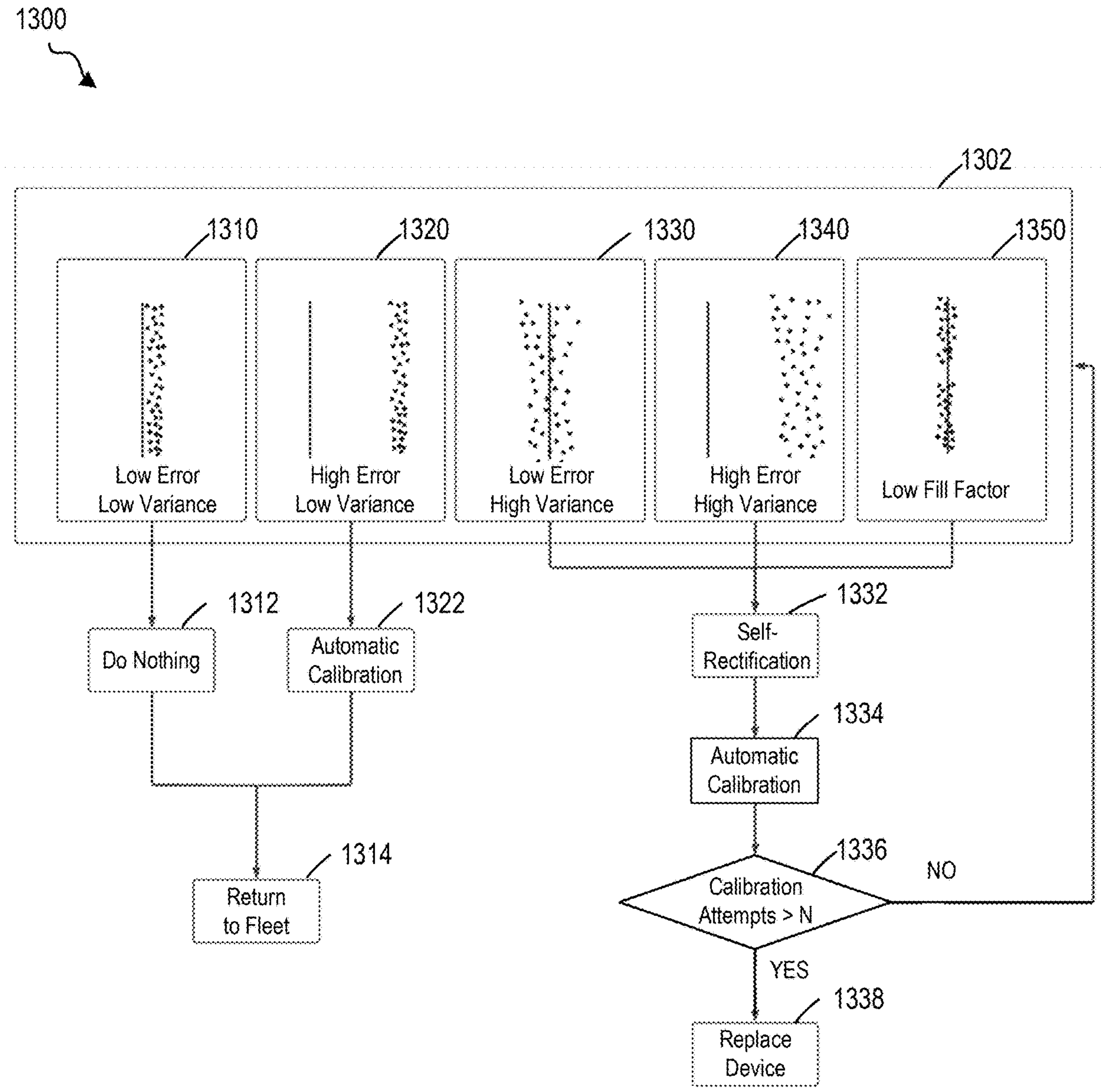
FIG. 13 is a flowchart of an example method for managing a pair of stereo imaging devices mounted on a mobile robot.

Referring now to FIG. 13, shown therein is a flowchart of an example method 1300 for managing a pair of stereo imaging devices mounted on a mobile robot. The pair of stereo imaging devices can be any pair of stereo imaging devices, such as imaging devices 320*a*, 320*b*, 520*a*, 520*b*, or 820*a*, 820*b* mounted on a mobile robot, such as mobile robots 110, 210, 310, 410, or 810. The mobile robot can be a part of a fleet of mobile robots.

The pair of stereo imaging devices 820*a*, 820*b* can be initially calibrated. For example, upon deployment, installation, or maintenance. In some embodiments, the initial calibration can involve manual intervention.

At 1302, the robot processor 212, 312 can determine the error and the variance of the pair of stereo imaging devices 820*a*, 820*b*. In some embodiments, method 1300 can be implemented as part of method 700. For example, at 708 of method 700, the robot processor 212, 312 can determine the error and the variance of the pair of stereo imaging devices 820*a*, 820*b*

The robot processor 212, 312 can compare the error and the variance of the pair of stereo imaging cameras 820*a*, 820*b* with pre-determined thresholds. Based on the comparison, the robot processor 212, 312 can determine that the current calibration of the pair of stereo imaging cameras 820*a*, 820*b* have low error and low variance 1310, as illustrated in FIG. 13. When the calibration results in low error and low variance 1310, no further action is necessary 1312 and the mobile robot 110 can return to the fleet 1314 and carry out various missions.

In some embodiments, the robot processor 212, 312 can determine that the current calibration 1302 of the pair of stereo imaging cameras 820*a*, 820*b* has high error and low variance 1320, as illustrated in FIG. 13. When the calibration results in high error and low variance 1320, the mobile robot 110 can be operated to perform an automatic calibration 1322. The automatic calibration 1322 can involve example method 700 of FIG. 7. Upon completion of the automatic calibration 1322, the mobile robot 110 can return to the fleet 1314 and carry out various missions.

In some embodiments, the robot processor 212, 312 can determine that the current calibration of the pair of stereo imaging cameras 820*a*, 820*b* are miscalibrated. Miscalibration can involve having low error and high variance 1330, high error and high variance 1340, or low fill factor 1350, as illustrated in FIG. 13. When the pair of stereo imaging cameras are miscalibrated, a self-rectification of the stereo imaging devices 820*a*, 820*b* can be performed 1332. The self-rectification 1332 can correct issues related to high variance of the current calibration of 1302. The self-rectification 1332 can be followed by an automatic calibration 1334. Similar to automatic calibration 1322, the automatic calibration 1334 can involve example method 700 of FIG. 7.

In some embodiments, the robot processor 212, 312 can also provide an alert to recommend replacement of the stereo imaging devices 820*a*, 820*b*. For example, on the robot processor 212, 312 can monitor the number of calibration attempts completed thus far 1336. If the number of calibration attempts exceeds a threshold number of calibration attempts (N), the robot processor 212, 312 can generate an alert to recommend replacement of the stereo imaging devices 820*a*, 820*b*.

If the number of calibration attempts is not greater than a threshold number of calibration attempts (N), the robot processor 212, 312 can return to 1302 may not generate the recommendation alert. The robot processor 212, 312 can return to 1302 to determine the mean and variance of the stereo imaging devices 820*a*, 820*b*.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

The invention claimed is:

1. A method of operating a mobile robot, the method comprising:

operating the mobile robot to autonomously navigate to a visual target, the mobile robot comprising at least one processor, at least one pair of stereo imaging devices mounted thereon, and a memory storing a current baseline for each pair of stereo imaging devices, each pair of stereo imaging devices comprising a first imaging device and a second imaging device, the current baseline for each pair of stereo imaging devices being representative of a distance between the first imaging device and the second imaging device of that pair of stereo imaging devices;

while the visual target is within a viewing range of a first pair of stereo imaging devices of the at least one pair of stereo imaging devices, operating the first pair of stereo imaging devices to capture an image of the visual target, the image comprising a plurality of sample points generated based on the visual target;

operating the at least one processor to:

generate a plurality of depth measurements for the plurality of sample points of the image;

compare the plurality of depth measurements with corresponding depth estimates for the plurality of sample points, the depth measurements being based on the current baseline of the first pair of stereo imaging devices, comprising, for each sample point of the plurality of sample points, determine a point difference between the depth measurement for that sample point and the depth estimate for that sample point;

compare the plurality of point difference s between the depth measurements and the depth estimates for the plurality of sample points with a Gaussian distribution;

in response to determining that the plurality of point differences is similar to a Gaussian distribution, update the current baseline to a value that minimizes an average of the point differences; and update the current baseline of the first pair of stereo imaging devices based on the comparisons of the plurality of depth measurements with the corresponding depth estimates; operating the mobile robot to autonomously execute a mission within an environment; and while executing the mission, operating the at least one processor to use the current baseline for sensing the environment.

2. The method of claim 1, comprises operating the at least one processor to:

estimate a pose of the visual target shown in the image based on the known dimensions of the visual target; and generate the plurality of depth estimates for the plurality of sample points based on the estimated pose of the visual target shown in the image.

3. The method of claim 1, wherein the average of the point differences comprises a mean of the point differences.

4. The method of claim 1, comprises operating the at least one processor to update the current baseline of the first pair of stereo imaging devices based on a first imaging device of the first pair of stereo imaging devices having a same pose before and after the update.

5. The method of claim 1, comprises operating the first pair of stereo imaging devices to capture the image of the visual target while a longitudinal axis defined by the first pair of stereo imaging devices is non-parallel to a plane defined by the visual target.

6. The method of claim 1, wherein the first pair of stereo imaging devices mounted thereon the mobile robot have a lower height than the visual target.

7. The method of claim 1, comprise operating the mobile robot to remain stationary while the first pair of stereo imaging devices capture the image of the visual target.

8. The method of claim 1, comprises operating the mobile robot to autonomously navigate to a pre-determined proximity of less than 4.5 meters from the visual target.

9. A system for operating a mobile robot, the system comprising:

at least one pair of stereo imaging devices mounted on the mobile robot, each pair of stereo imaging devices comprising a first imaging device and a second imaging device;

a memory storing a current baseline for each pair of stereo imaging devices, the current baseline for each pair of stereo imaging devices being representative of a distance between the first imaging device and the second imaging device of that pair of stereo imaging devices; and at least one processor operable to:

autonomously navigate the mobile robot to a visual target;

while the visual target is within viewing range of a first pair of stereo imaging devices of the at least one pair of stereo imaging devices, operate the first pair of stereo imaging devices to capture an image of the visual target, the image comprising a plurality of sample points generated based on the visual target;

generate a plurality of depth measurements for the plurality of sample points of the image;

compare the plurality of depth measurements with corresponding depth estimates for the plurality of sample points, the depth measurements being based on the current baseline of the first pair of stereo imaging devices comprising, for each sample point of the plurality of sample points, determine a point difference between the depth measurement for that sample point and the depth estimate for that sample point;

compare the plurality of point differences between the depth measurements and the depth estimates for the plurality of sample points with a Gaussian distribution;

in response to determining that the plurality of point differences is similar to a Gaussian distribution, update the current baseline to a value that minimizes an average of the point differences;

update the current baseline of the first pair of stereo imaging devices based on the comparisons of the plurality of depth measurements with the corresponding depth estimates;

operate the mobile robot to autonomously execute a mission within an environment; and while executing the mission, use the current baseline for sensing the environment.

10. The system of claim 9, wherein the at least one processor is operable to:

estimate a pose of the visual target shown in the image based on the known dimensions of the visual target; and generate the plurality of depth estimates for the plurality of sample points based on the estimated pose of the visual target shown in the image.

11. The system of claim 9, wherein the average of the point differences comprises a mean of the point differences.

12. The system of claim 9, wherein the at least one processor is operable to update the current baseline of the first pair of stereo imaging devices based on a first imaging device of the first pair of stereo imaging devices having a same pose before and after the update.

13. The system of claim 9, wherein the pair of stereo imaging devices are operable to capture the image of the visual target while a longitudinal axis defined by the first pair of stereo imaging devices is non-parallel to a plane defined by the visual target.

14. The system of claim 9, wherein the first pair of stereo imaging devices mounted thereon the mobile robot have a lower height than the visual target.

15. The system of claim 9, wherein the at least one processor is operable to maintain the mobile robot in a stationary position while the first pair of stereo imaging devices capture the image of the visual target.

16. The system of claim 9, wherein the at least one processor is operable to autonomously navigate the mobile robot to a pre-determined proximity of less than 4.5 meters from the visual target.

17. A method of operating a mobile robot, the method comprising:

operating the mobile robot to autonomously navigate to a visual target, the mobile robot comprising at least one processor, at least one pair of stereo imaging devices mounted thereon, and a memory storing a current baseline for each pair of stereo imaging devices, each pair of stereo imaging devices comprising a first imaging device and a second imaging device, the current baseline for each pair of stereo imaging devices being representative of a distance between the first imaging device and the second imaging device of that pair of stereo imaging devices;

while the visual target is within a viewing range of a first pair of stereo imaging devices of the at least one pair of stereo imaging devices, operating the first pair of stereo imaging devices to capture an image of the visual target, the image comprising a plurality of sample points generated based on the visual target;

operating the at least one processor to:

generate a plurality of depth measurements for the plurality of sample points of the image;

compare the plurality of depth measurements with corresponding depth estimates for the plurality of sample points, the depth measurements being based on the current baseline of the first pair of stereo imaging devices, comprising, for each sample point of the plurality of sample points, determine a point difference between the depth measurement for that sample point and the depth estimate for that sample point;

compare the plurality of point differences between the depth measurements and the depth estimates for the plurality of sample points with a statistical distribution representative of differences identified;

in response to determining that the plurality of point differences is similar to the statistical distribution, update the current baseline to a value that minimizes an average of the point differences; and update the current baseline of the first pair of stereo imaging devices based on the comparisons of the plurality of depth measurements with the corresponding depth estimates;

operating the mobile robot to autonomously execute a mission within an environment; and while executing the mission, operating the at least one processor to use the current baseline for sensing the environment.

18. The method of claim 17, comprises operating the at least one processor to:

estimate a pose of the visual target shown in the image based on the known dimensions of the visual target; and generate the plurality of depth estimates for the plurality of sample points based on the estimated pose of the visual target shown in the image.

19. The method of claim 17, comprises operating the at least one processor to update the current baseline of the first pair of stereo imaging devices based on a first imaging device of the first pair of stereo imaging devices having a same pose before and after the update.

20. The method of claim 1, comprises operating the first pair of stereo imaging devices to capture the image of the visual target while a longitudinal axis defined by the first pair of stereo imaging devices is non-parallel to a plane defined by the visual target.

* * * * *